UNITED STATES PATENT OFFICE.

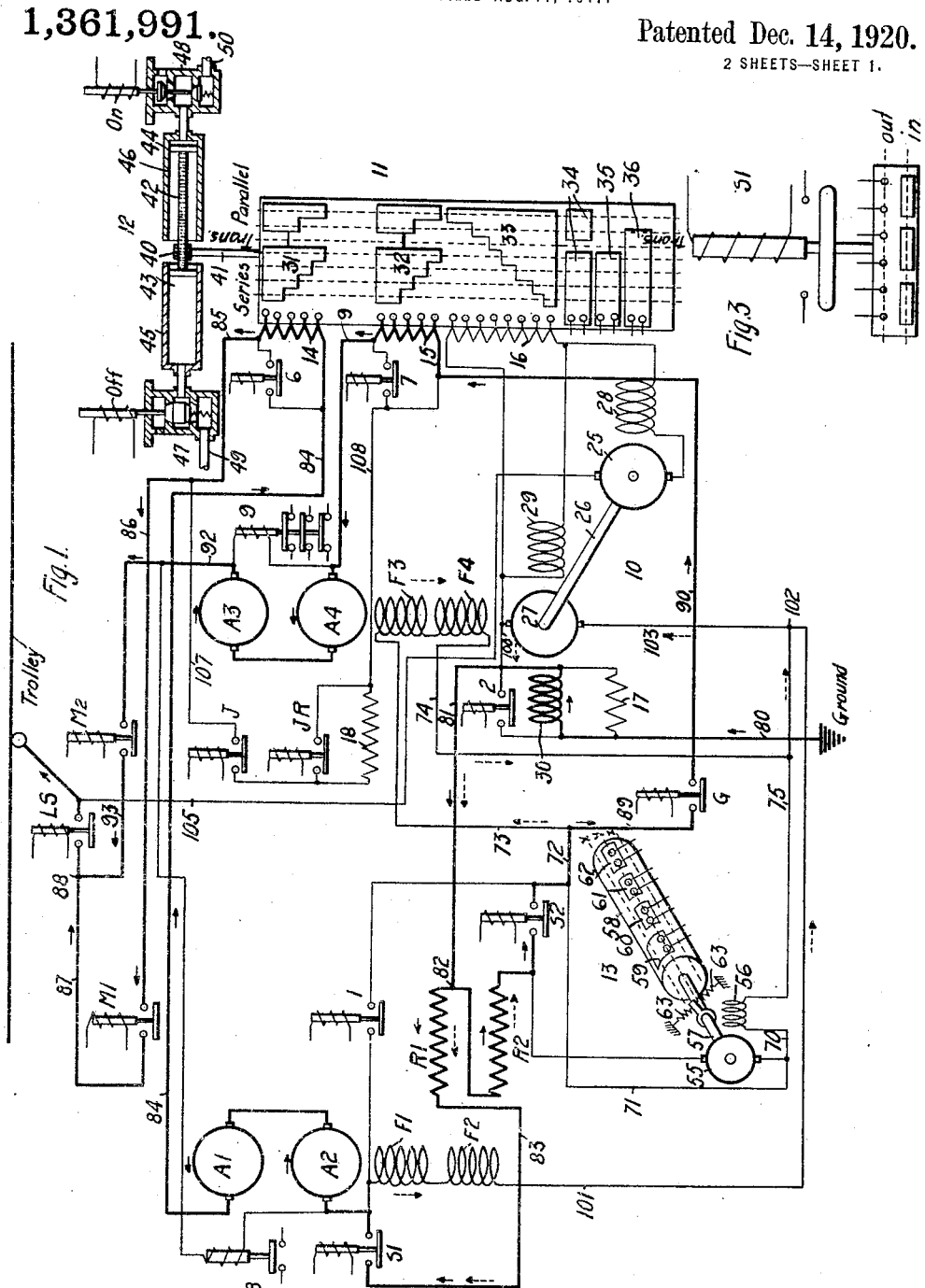
R. E. HELLMUND.
SYSTEM OF CONTROL.
APPLICATION FILED AUG. 11, 1917.
1,361,991.
Patented Dec. 14, 1920.
2 SHEETS—SHEET 1.
WITNESSES:
J. T. Wurml.
W. P. Coley
INVENTOR
Rudolf E. Hellmund
BY Wesley G. Carr
ATTORNEY R. E. HELLMUND.
SYSTEM OF CONTROL.
APPLICATION FILED AUG. 11, 1917.
1,361,991.
Patented Dec. 14, 1920.
2 SHEETS—SHEET 2.
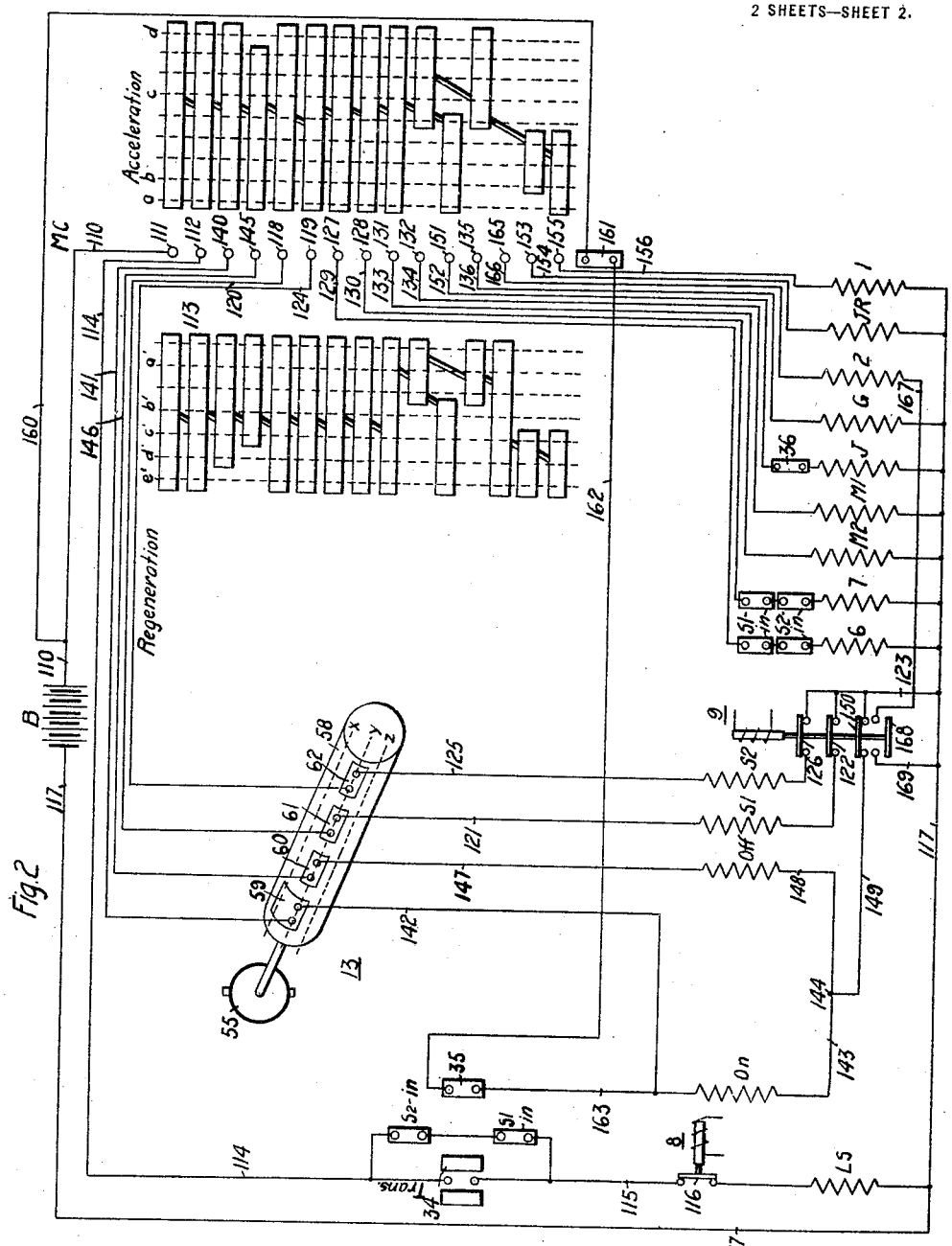
WITNESSES:
J.T. Wurmb
W.R. Coley
INVENTOR
Rudolf E. Hellmund
BY
Wesley G. Carr
ATTORNEY

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,361,991.  Specification of Letters Patent.  Patented Dec. 14, 1920.

Application filed August 11, 1917. Serial No. 185,697.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control and especially to the automatic control of electric railway-vehicle motors and the like.

One of the principal difficulties encountered in connection with regenerative control when employing substantially the same connections for both acceleration and regeneration is connecting the machines to the supply circuit without causing any undesirable current surges or voltage fluctuations, which tend to injure the machines and unduly disturb the trolley voltage. Particularly in the case of a locomotive hauling a heavy freight train, it is advisable to always produce a relatively small torque when conecting the machines to the supply circuit until the "slack" has been taken up in the train. One such system is set forth in my copending application, Serial No. 184,797, filed August 7, 1917, patented Jan. 20, 1920, No. 1,328,515.

It is one object of my present invention to provide a system of the above-indicated character which shall be relatively simple in its automatic operation for suitably connecting the main machines to the supply circuit and to the customary source of auxiliary energy for exciting the main field windings with a minimum of current surges and other electric disturbances.

More specifically stated, it is an object of my invention to provide a system of the class under consideration, wherein initially a main armature and field winding are connected in series relation to the supply circuit, and a normally open auxiliary exciter circuit for the field winding is closed only upon the occurrence of a predetermined relation between the voltages of the exciting circuit and of the main field winding.

In the accompanying drawings, Figure 1 is a diagrammatic view of the main circuits of a system of control embodying my present invention; Fig. 2 is a diagrammatic view of an auxiliary governing system for the main circuits of Fig. 1; and Fig. 3 is a detail diagrammatic view of a complete switch that is employed in the system shown in Fig. 1.

Referring to Fig. 1 of the drawings, the system shown comprises suitable supply-circuit conductors "Trolley" and "Ground"; a plurality of main dynamo-electric machines respectively having commutator-type armatures A1, A2, A3 and A4 and field windings F1, F2, F3 and F4 of the series type; a motor-generator set 10 for supplying auxiliary exciting energy to the main field windings; a main controller 11 having an actuating mechanism 12 for varying the active resistance value of certain of the illustrated circuits; a plurality of resistors R1, R2, 14, 15, 16, 17 and 18 for purposes to be set forth; a plurality of electrically-controlled switches LS, M1, M2, J, JR, G, S1, S2, 1, 2, 6 and 7; a normal-voltage relay 8 that is connected across all the main armatures when disposed in series relation; an over-voltage relay 9 that is connected across the permanently series-related armatures A3 and A4; and a torque motor relay device 13 for automatically regulating certain of the machine circuits under conditions to be set forth.

The illustrated system embodies pairs of permanently series-connected armatures which are adapted, in accordance with a well-known switching arrangement, for connection in either series or parallel relation to provide different ranges of operating speeds. The present system is, therefore, particularly fitted for relatively high-voltage operation, although my invention is not so restricted in its application.

The motor-generator set 10 comprises an auxiliary motor or driving armature 25 which may be mechanically coupled through a shaft 26, for example, with a generator or exciting armature 27. A series related field winding 28 is provided for the driving armature 25 and an exciting field winding 29 which is energized in accordance with the load of the motor-generator set acts cumulatively during regeneration with respect to a main-current-excited field winding 30 for suitably energizing the generating armature 27.

The main drum controller 11 is provided with suitable contact segments 31, 32 and 33 for varying the active circuit value of the resistors 14, 15 and 16, the two former of which are connected in series relation with the respective pairs of main armatures and the latter of which is connected in shunt relation to the exciting field winding 29 for the generating armature 27. Suitable auxiliary circuit contact segments 34, 35 and 36 are also provided upon the control drum 11 for purposes to be set forth.

The actuating mechanism 12 is of a familiar electrically controlled, pneumatically-operated type comprising a pinion 40 which is rigidly secured to the operating shaft 41 for the control drum 11 to a suitable mesh with a horizontally-movable rack member 42, the opposite ends of which constitute pistons 43 and 44 that travel within appropriate operating cylinders 45 and 46, respectively. A normally open valve 47 having an actuating coil "Off" communicates with the outer end of the cylinder 45, while a normally closed valve 48 having an actuating coil "On" is associated with the outer end of the other cylinder 46. Fluid pressure from any suitable source (not shown) may be conveyed through pipes or passages 49 and 50 to the valves 47 and 48, respectively.

The mechanical operation of the apparatus just described may be set forth as follows: By reason of the normally open condition of the valve 47, fluid pressure is initially present in the operating cylinder 45 to bias the actuating device to the illustrated position. Upon the concurrent energization of the actuating coils "On" and "Off," such initial unbalanced fluid-pressure conditions are reversed, that is, fluid pressure is admitted through the valve 48 to the cylinder 46 and is released from the cylinder 45 through the valve 47 to the atmosphere. Consequently, movement of the pistons toward the left, in the illustrated case, occurs to correspondingly actuate the control drum 11. To arrest such movement at any time, it is merely necessary to deenergize the "off" coil, whereupon balanced high-pressure conditions obtain in the mechanism and a positive and reliable stoppage thereof is effected.

To provide a return movement of the apparatus, the actuating coils "On" and "Off" are concurrently deënergized, whereupon fluid-pressure conditions revert to the original unbalanced state and the desired backward movement takes place.

The torque relay device 13 comprises a commutator-type armature 55 and an exciting field winding 56. Upon the relay-armature shaft 57, a small drum or cylinder 58 is mounted and carries a plurality of auxiliary-circuit contact segments 59, 60, 61 and 62 for effecting various circuit changes in accordance with the occupation of its positions $x$, $y$ and $z$ by the relay device, in response to the torque produced in the armature 55. The relay device is normally biased to the illustrated intermediate position $y$ by means of suitable centering springs 63.

The relay armature 55 is connected directly across the switch S2, thereby receiving the full exciting-circuit voltage minus the main-field-winding voltage whenever the switch S2 is open, as will be evident from the subsequent tracing of machine circuits, while one terminal of the relay field winding 56 is connected through conductors 70, 71, 72 and 73 to one terminal of the main field winding F3, whence circuit is continued through the field windings F3 and F4 and conductors 74 and 75 to the other terminal of the relay field winding. Under open-circuit conditions of the switch S2, therefore, the torque relay device 13 is adapted to operate in accordance with the relative voltage values of the exciting-circuit, including the generating armature 27, and of the series-related main field windings F3 and F4. As set forth in connection with Fig. 2, the relay device governs the operation of the main controller 11 to thereby vary the excitation of the generating armature 27 and thus effect any desired balanced relation between the two voltages just mentioned, at the beginning of an operating period.

Assuming that regenerative operation, for example, has been effected in a manner to be hereinafter set forth, the main or regenerative circuit, indicated by the solid arrows, is established from the supply-circuit conductor "Ground" through conductor 80, the parallel-related exciting field winding 30 for the generating armature 27 and resistor 17, or through the switch 2 for short-circuiting the field winding 30, as the case may be, and conductor 81 to a junction-point 82, where the circuit divides, one branch including stabilizing resistor R1, conductor 83, switch S1, main armatures A2 and A1, conductor 84, accelerating resistor 14 or short-circuiting switch 6, conductors 85 and 86, switch M1 and conductor 87 to a second junction-point 88, and the other branch traversing stabilizing resistor R2, switch S2, conductors 72 and 89, switch G, conductor 90, accelerating resistor 15 or short-circuiting switch 7, conductor 91, main armatures A4 and A3, conductor 92, switch M2 and conductor 93 to the junction-point 88, whence a common circuit is completed through line switch LS to the "trolley."

The exciting or main-field-winding circuit, indicated by the dotted arrows, is established from the positive terminal of the auxiliary generating armature 27 through conductors 100 and 81 to the junction-point 82, where the circuit divides, one branch including stabilizing resistor R1, conductor 130

83, switch S1, main field windings F1 and F2 and conductor 101 to another junction-point 102, and the other branch including stabilizing resistor R2, switch S2, conductors 72 and 73, main field windings F3 and F4 and conductors 74 and 75 to the junction-point 102, whence a common circuit is completed through conductor 103 to the negative terminal of the exciting armature 27.

An auxiliary circuit is established from the "trolley" through conductor 105, auxiliary driving armature 25 and exciting field winding 28 therefor, the parallel-related variable resistor 16 and exciting field winding 29 for the generating armature 27, conductor 100 and main-current-excited field winding 30 for the exciting armature to the negative supply-circuit conductor Ground.

Under conditions of series connection of the sets of main armatures, the main control drum 11 occupies its positions, marked "Series," to the left of the transition or change-over position marked "Trans.," while the main-armature circuit is established from "ground" through the stabilizing resistor R1 and the main armatures A1 and A2, as far as the conductor 85, in accordance with the previously traced connections, circuit being completed from conductor 85 through conductor 107, switch J, transition resistor 18 or short-circuiting switch JR therefor, and conductor 108 to the accelerating resistor 15, whence circuit is completed through the main armatures A4 and A3, as previously described.

Reference may now be had to Fig. 2, wherein the auxiliary governing system shown comprises the actuating coils for the various switches and for the operating mechanism 12 of Fig. 1, together with the bridging contact members of the normal-voltage relay 8 and of the over-voltage relay 9; a plurality of interlocking contact members that are associated with, and actuated by, the correspondingly designated switches in accordance with the familiar type of construction that is illustrated in Fig. 3; the contact segments of the torque relay device 13; a master controller MC for primarily governing the operation of the system; and a battery B or other suitable source of energy for the various auxiliary circuits.

Assuming that the master controller MC is actuated to its initial regenerative position $a'$, for example, one circuit is established from the positive terminal of the battery B through conductor 110, control fingers 111 and 112 which are bridged by contact segment 113 of the master controller, conductor 114, contact segment 34 of the main control drum 11 in any position thereof but the transition position, conductor 115, bridging contact member 116 of the normal-voltage relay device 8 in its lower position, the actuating coil of the switch LS and conductor 117 to the negative battery terminal. However, if the switches S1 and S2 are closed during the transitional movement of the main controller 11, then the energizing circuit for the actuating coil of the line switch LS is not interrupted by reason of the connection of conductors 114 and 115 through the illustrated interlocks S2—in and S1—in.

The contact segment 113 of the master controller in position $a'$ also energizes control fingers 118 and 119, a circuit being continued from control fingers 118 through conductor 120, contact segment 61 of the torque relay 13 in its normal or intermediate position $y$, conductor 121, actuating coil of the switch S1, bridging contact member 122 of the over-voltage relay 9 in its normal or lower position and conductor 123 to the negative battery conductor 117. A similar circuit is established from the control finger 119 through the conductor 124, contact segment 62 of the torque relay 13 in its position $y$, conductor 125, actuating coil of the switch S2, bridging contact member 126 of the over-voltage relay and conductor 123 to the negative conductor 117.

Control fingers 127 and 128 are also energized in the initial regenerative position of the master controller, circuit being continued from these control fingers through conductors 129 and 130, respectively, sets of interlocks S1—in and S2—in and the actuating coils of the switches 6 and 7, whereby the accelerating resistors 14 and 15 are short-circuited whenever the switches S1 and S2 for closing the exciting circuit for the main field windings occupy their operative positions.

Still further initial circuits are completed from the master controller contact segment 113 through control fingers 131 and 132, conductors 133 and 134, respectively, and the actuating coils of the switch M2 and of the parallel-connecting switch M1.

Another circuit is established from control finger 135 which engages contact segment 113 in position $a'$ of the master controller, through conductor 136 and the actuating coil of the parallel-connecting switch G.

A further circuit is established from the contact segment 113 through control finger 140, conductor 141, contact segment 59 of the torque relay 13 in either of its positions $y$ or $x$, conductor 142, the actuating coil "On" and conductor 143 to a junction-point 144. A similar circuit is continued from the contact segment 113 through control finger 145, conductor 146, contact segment 60 of the torque relay 13 in its position $y$, conductor 147, the actuating coil "Off" and conductor 148 to the junction-point 144, whence a common circuit is completed through conductor 149, bridging contact member 150 of the over-voltage relay 9 in its lower position and conductor 123 to the negative battery conductor 117.

During such periods during regeneration as the actuating coils "On" and "Off" are concurrently deënergized, backward movement of the main controller 11 occurs to gradually vary the active value of the accelerating resistors 14 and 15, unless the short-circuiting switches 6 and 7 are already closed, and to gradually increase the strength of the exciting field winding 29 for the generating armature 27, thereby correspondingly increasing the delivered voltage thereof to compensate for the gradual decrease of main-armature speed during the retardation period.

When conditions are suitable for series connection of the sets of main armatures, the master controller may be moved to its position $b'$ to initially complete a circuit from the contact segment 113 through control finger 151, conductor 152, contact segment 36 of the main controller 11 and the actuating coil of the switch J to the negative battery 117. The parallel-connecting switches M1 and G are opened just before position $b'$ is reached, by reason of the disengagement of the contact segment 113 from the corresponding control fingers. The previously-described series relation of the sets of main armatures is thus effected, the transition resistor 18 being initially connected in circuit.

By moving the master controller to its next position $c'$, a new circuit is established from the contact segment 113 through control finger 153, conductor 154 and the actuating coil of the switch JR, whereby the transition resistor 18 is short-circuited.

Furthermore, in position $c'$, the contact segment 113 engages control finger 155, whence circuit is continued through conductor 156 and the actuating coil of the switch 1. In this way, since the switches S1 and S2 are already closed, the stabilizing resistors R1 and R2 are connected in parallel relation, inasmuch as the total resistance is no longer required during series operation of the main armatures. However, such exclusion of the resistors R1 and R2 is not essential to proper operation of the system.

By moving the master controller to its next position $d'$, the only circuit change accomplished is the deënergization of the actuating coil "Off," whereby the movement of the control drum 11 may be manually arrested at any desired time, in accordance with the previously described operating principles of the actuating mechanism 12. In the final position $e'$, the "on" coil is also deënergized to effect a backward movement of the controller 11. Thus, by suitable manipulation of the master controller to positions $c'$, $d'$ and $e'$, the main controller 11 may be moved in either direction or held stationary to properly meet operating conditions.

Assuming that the master controller is moved from any operative position to its intermediate "off" or coasting position, the actuating coils "On" and "Off" are both deënergized in case the main control drum 11 occupies any of its parallel positions, that is, the positions to the right of the transition notch and, consequently, the controller is moved backwardly in the previously-described manner. Thus, the main controller 11 is always actuated from a parallel-connecting or high-speed position toward a series-connecting or low-speed position when the master controller is moved to its coasting position.

Furthrmore, the exciting circuit switches S1 and S2 are also opened upon the above-mentioned return movement of the master controller.

However, if the main controller 11 already occupies a series-connecting position, that is, a position to the left of the transition notch, when the master controller is thrown to its "off" position, then the previously described backward movement of the controller will not occur, by reason of the establishment of a new circuit from the positive battery terminal through conductors 110 and 160, contact segment 161 of the master controller in its "off" or coasting position, conductor 162, contact segment 35 of the main controller 11 in any of its series-connecting positions and conductor 163 to the actuating coil "On." Since, under such circumstances, only the actuating coil "Off" is deënergized, the actuating mechanism 12 remains in whatever position it happens to occupy. Furthermore, the previously-described backward movement of the main controller 11, when occupying any of its parallel-connecting positions, upon actuation of the master controller to its "off" position, will continue only until the initial series-connecting position is reached, when the new auxiliary circuit just traced will be completed to arrest the main-controller movement.

If the master controller is again moved to its initial regenerative or parallel-connecting position $a'$ during the coasting operation of the main machines, the line switch LS is closed in accordance with the previously traced circuit. The sets of main armatures are thus connected in series relation with the corresponding sets of main field windings through the exciting armature 27, across the supply circuit, the main field winding receiving no energy from the exciting armature 27 by reason of the normally open condition of the switches S1 and S2. A slight accelerating current of short duration will thus initially traverse the main machines which, however, produces no undesirable effects. It will be noted that the main-field-winding excitation is in the proper direction, namely, the direction previously pointed out. The temporary circuit in question may be traced from the trolley through line switch LS, switch M1, accelerating resistor 14, main armatures A1 and A2, main field windings F1 and F2 in the same direction (indicated by the dotted arrow) taken during regeneration, exciting armature 27, field winding 30 therefor, and conductor 80 to ground. A similar circuit obtains through the other pair of main machines.

The torque relay 13 will then oscillate from one to another of its three positions to actuate the main controller 11 into such a position that a predetermined relation exists between the voltage across the switch S2, and the voltage of the main field windings F3 and F4, by reason of the previously described connection of the torque relay elements. As hereinbefore pointed out, the voltage across the switch S2 equals the difference between the full exciting-circuit voltage and the main-field-winding voltage and is, therefore, proportional to the exciting-circuit voltage. When the main controller 11 has been so adjusted that a substantially zero or other predetermined slight voltage, either positive or negative, obtains across the switch S2, then the centering springs 63 will hold the torque relay 13 in its intermediate position $y$ to permit the previously-traced energizing circuits for the actuating coils of the switches S1 and S2. Since, after the closure of the switch S2, a negligible voltage exists across the terminals of the relay armature 55, the torque relay remains in its illustrated intermediate position and subsequent control of the main drum 11 is effected by the previously described suitable manual operation of the master controller.

The above-mentioned actuation of the main controller 11 in accordance with the movements of the torque relay 13, which movements depend upon the relative values of exciting-circuit voltage and of main-field-winding voltage, is accomplished by reason of the fact that whenever the relay is moved to its position $x$ the "off" coil is deënergized to stop the main controller and thus discontinue the forward or voltage-decreasing movement thereof, whereas upon opposite movement of the torque relay from its intermediate position $y$ to position $z$, the actuating coils "On" and "Off" are both deënergized to effect a backward movement of the main controller and thus increase the voltage of the auxiliary generator armature 27 and, therefore, of the exciting circuit.

To preclude the possibility of regenerative operation, whenever the sets of main armatures are connected in series relation and a relatively high machine-speed obtains, which would tend to produce an undesirably heavy current surge, the line switch LS is prevented from closing when the master controller is moved to its operative positions by reason of the fact that the normal-voltage relay device 8, which is governed by the combined voltage of all the main armatures, will, under such circumstances, occupy its upper or open-circuit position. Thus, the sets of main armatures must be connected in parallel relation under such high-speed conditions, by proper manipulation of the master controller, before the normal-voltage relay 8 will drop to its lower position to permit the closure of the line switch LS. The precaution just recited is especially necessary by reason of the fact that the minimum available exciting-circuit voltage must have a value higher, by a predetermined amount, than the main-field-winding voltage at all times when the main machines are running at a speed that is too high to permit of series regeneration thereof.

To accomplish the necessary transition from parallel to series relation at the beginning of a regenerative period when the speed is relatively low after the line switch LS is closed, without causing undesirably high main-machine currents and torques, the contact segments 34 of the main controller 11 are provided in the energizing circuit for the actuating coil of the line switch LS, so that the line switch is open while the main drum 11 passes its transition position unless the switches S1 and S2 are closed, as previously explained. The subsequent automatic and manual operations are similar to those already set forth.

In the case of an occurrence of over-voltage conditions during machine operation, the over-voltage relay 9 lifts to deënergize the circuits for the actuating coils "On" and "Off" and for the actuating coils of the switches S1 and S2, while a new auxiliary circuit is completed from the contact segment 113 through control finger 165, conductor 116, actuating coil of the switch 2, conductor 167, bridging contact member 168 of the over-voltage relay 9 in its upper position and conductor 169 to the negative conductor 117. The main controller 11 is thus returned toward a position, wherein a relatively high main circuit resistance is included in circuit, while exciting-circuit switches S1 and S2 are open and the main-current-excited field winding 30 for the auxiliary generator armature 27 is short-circuited. The over-voltage conditions are thus speedily counteracted by the combined results of the actions just recited.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a dynamo-electric machine having an armature and a field winding, of a normally open auxiliary exciting circuit for said field winding, means for initially connecting said armature and field winding in series relation to the supply circuit, and means for subsequently closing said exciting circuit under predetermined relative electrical conditions of the exciting circuit and the field winding.

2. In a system of control, the combination with a supply circuit and a dynamo-electric machine having an armature and a field winding, of a normally open auxiliary exciting circuit for said field winding, means for initially connecting said armature and field winding in series relation to the supply circuit, and means for closing said exciting circuit only upon the occurrence of a predetermined relation between the voltages of said exciting circuit and of said field winding.

3. In a system of control, the combination with a supply circuit and a main dynamo-electric machine having an armature and a field winding, of a normally disconnected generator armature for exciting said field winding, means for initially connecting said main armature and field winding and said generator armature across the supply circuit, and relay means for automatically connecting the generator armature to the main field winding upon the occurrence of a predetermined relation between the voltages of the generator armature and the main field winding.

4. In a system of control, the combination with a supply circuit, and a plurality of dynamo-electric machines severally having armatures and field windings, of a normally open exciting circuit for said field windings, means for initially connecting the machines to the supply circuit with the corresponding armatures and field windings in series relation, means for subsequently closing said exciting circuit under predetermined relative electrical conditions of the exciting circuit and the field windings, and means for effecting a speed-changing transition of said machines with the supply circuit disconnected therefrom under predetermined conditions.

5. In a system of control, the combination with a supply circuit, and a plurality of main dynamo-electric machines severally having armatures and field windings, of a normally disconnected generator armature for exciting said field windings, means for initially connecting the main machines to the supply circuit with the corresponding armatures and field windings in series relation with said generator armature, means for automatically connecting the generator armature to the main field windings upon the occurrence of a predetermined relation between the voltages of the generator armature and the main field winding, and means for effecting a speed-changing transition of said machines with the supply circuit disconnected therefrom under predetermined conditions.

6. In a system of control, the combination with a supply circuit, and a plurality of main dynamo-electric machines severally having armatures and field windings, of a normally disconnected generator armature for exciting said field windings, means for initially connecting the main machines to the supply circuit with the corresponding armatures and field windings in series relation with said generator armature, means for automatically connecting the generator armature to the main field windings upon the occurrence of a predetermined relation between the voltages of the generator armature and the main field winding, and means for preventing said initial connection during the continuation of a predetermined relatively high voltage across said machines when connected in series relation.

7. In a system of control, the combination with a distribution circuit and a dynamo-electric machine having an armature and a field winding, of an auxiliary exciting circuit for said field winding, manual means for connecting said armature and field winding in series relation to the distribution circuit, and means responsive to certain electrical conditions of the exciting circuit and the field winding for closing said exciting circuit.

8. In a system of control, the combination with a distribution circuit and a dynamo-electric machine having an armature and a field winding, of an auxiliary exciting circuit for said field winding, means for initially connecting said armature and field winding in series relation to the distribution circuit, and means responsive to certain circuit conditions for subsequently closing said exciting circuit.

9. In a system of control, the combination with a dynamo-electric machine, of a controller for regulating a certain machine circuit, a switch for opening and closing another machine circuit, and means responsive to the condition of said switch for effecting different movements of said controller.

10. In a system of control, the combination with a dynamo-electric machine having an armature and a field winding, of a controller having two separated portions for regulating the armature circuit, a switch for opening and closing another machine circuit, and means adapted to govern the condition of said switch for effecting a movement of said controller either from any position of one portion to a position of the other portion, or a complete return movement.

11. In a system of control, the combination with a plurality of dynamo-electric machines, of a controller having two portions respectively corresponding to series and to parallel machine operation and having an intermediate transition position, a switch for opening and closing a certain machine circuit, and means adapted to govern the position of said switch for effecting a movement of said controller either from any parallel position to a point just beyond the transition position, or a complete return movement.

12. In a system of control, the combination with a dynamo-electric machine, of a controller having two separated portions for regulating a certain machine circuit, means for manually governing said controller under normal operating conditions, and means for automatically actuating said controller from a position of one portion to a position of the other or allowing it to remain in a position of the latter portion under other conditions.

13. In a system of control, the combination with a plurality of dynamo-electric machines, of a controller having two portions respectively corresponding to series and to parallel machine operation, means for manually governing said controller in a step-by-step manner under normal operating conditions, and means for automatically actuating said controller from any position in the parallel portion to a position of the series portion or allowing it to remain in a position of the series portion upon the return of said manual governing means to its initial condition.

14. In a system of control, the combination with a supply circuit and a dynamo-electric machine, of a controller having two separated portions for regulating a certain machine circuit, a switch for opening and closing another machine circuit, a switching device for connecting the machine to the supply circuit, and means for effecting closure of said switching device during movement of said controller from a position of the one portion to a position of the other portion only when said switch is closed.

15. In a system of control, the combination with a supply circuit and a plurality of dynamo-electric machines severally having armatures and field windings, of a controller having two portions respectively corresponding to series and to parallel machine operation, a switch for opening and closing an exciting circuit for said field windings, a switching device for connecting the machines to the supply circuit, and interlocking means for effecting closure of said switching device during the transitional movement of said controller only when said switch is closed.

In testimony whereof I have hereunto subscribed my name this 31st day of July, 1917.

RUDOLF E. HELLMUND.

It is hereby certified that in Letters Patent No. 1,361,991, granted December 14, 1920, upon the application of Rudolf E. Hellmund, of Swissvale, Pennsylvania, for an improvement in "Systems of Control," errors appear in the printed specification requiring corrections as follows: Page 4, line 125, for the word "winding" read *windings;* page 5, line 113, for the reference-numeral "116" read *166;* and that the said Letters Patent should be read with these corrections therein that the same may conform to the record of the case in the Patent Office.

Signed and sealed this 25th day of January, A. D., 1921.

[SEAL.]

L. B. MANN,
*Acting Commissioner of Patents.*

Cl. 172—179.